(12) United States Patent
Littlejohn et al.

(10) Patent No.: US 9,779,237 B2
(45) Date of Patent: Oct. 3, 2017

(54) DETECTION OF NON-VOLATILE CHANGES TO A RESOURCE

(71) Applicant: NetIQ Corporation, Provo, UT (US)

(72) Inventors: David Henry Littlejohn, Houston, TX (US); Stuart Richard Kemp, Houston, TX (US); Roger Glenn Huebner, Sugar Land, TX (US)

(73) Assignee: NetIQ Corporation, Provo, UT (US)

(*) Notice: Subject to any disclaimer, the term of this patent is extended or adjusted under 35 U.S.C. 154(b) by 338 days.

(21) Appl. No.: 14/211,988

(22) Filed: Mar. 14, 2014

(65) Prior Publication Data

US 2014/0283042 A1    Sep. 18, 2014

Related U.S. Application Data

(60) Provisional application No. 61/788,827, filed on Mar. 15, 2013.

(51) Int. Cl.
   *G06F 21/00* (2013.01)
   *G06F 21/55* (2013.01)
   *G06F 21/62* (2013.01)
   *G06F 21/60* (2013.01)

(52) U.S. Cl.
   CPC ......... *G06F 21/554* (2013.01); *G06F 21/552* (2013.01); *G06F 21/60* (2013.01); *G06F 21/62* (2013.01); *G06F 21/6218* (2013.01); *G06F 2221/2101* (2013.01); *G06F 2221/2105* (2013.01); *G06F 2221/2113* (2013.01)

(58) Field of Classification Search
   CPC ...... G06F 21/554; G06F 21/552; G06F 21/60; G06F 21/62; G06F 21/6218; G06F 2221/2101; G06F 2221/2113
   USPC .......................................................... 726/22
   See application file for complete search history.

(56) References Cited

U.S. PATENT DOCUMENTS

| | | |
|---|---|---|
| 5,745,903 A | 4/1998 | Huan |
| 7,290,266 B2 * | 10/2007 | Gladstone et al. ........... 719/318 |
| 7,657,574 B2 | 2/2010 | Gupta et al. |
| 7,783,677 B2 | 8/2010 | Li et al. |
| 7,890,551 B2 | 2/2011 | Benelisha et al. |
| 7,934,091 B2 * | 4/2011 | Stamos et al. ................ 713/164 |
| 8,452,736 B2 | 5/2013 | Reddy et al. |
| 8,548,961 B2 | 10/2013 | Bath et al. |
| 2007/0039049 A1 * | 2/2007 | Kupferman ......... G06F 11/3495 726/22 |
| 2008/0010681 A1 * | 1/2008 | Armingaud et al. ........... 726/23 |

* cited by examiner

*Primary Examiner* — Mahfuzur Rahman
*Assistant Examiner* — Narciso Victoria
(74) *Attorney, Agent, or Firm* — Schwegman Lundberg & Woessner, P.A.

(57) ABSTRACT

Policies are communicated to a kernel service of an Operating System (OS) that define resource identifiers and events. When an event is received (from the kernel service) for a resource, the event is noted. Subsequent events received (from the kernel service) are: tracked, evaluated, and a determination is made whether a near real-time or real-time notification is to be sent.

19 Claims, 4 Drawing Sheets

DETECTION OF NON-VOLATILE CHANGES TO A RESOURCE

RELATED APPLICATION

The present application claims priority under 35 U.S.C. 119(e) to, and is a non-provisional of U.S. Provisional Application No. 61/788,827, filed on Mar. 15, 2013, and entitled: "Method for Continuous Near Real-Time Detection of Indirect File Changes Optimized for Noise Reduction;" the disclosure of which in its entirety is incorporated by reference herein.

BACKGROUND

Electronic security is a major concern for governments, organizations, businesses, and individuals. It seems that a day cannot go by without some news related to a security breach.

Moreover, it is becoming clear that security concerns are not just an issue with unauthorized intruders into electronic systems; rather, a decent amount of security breaches occur from someone having authorized accessed to the electronic systems; such as, an employee or a contractor of an employer.

Organizations do have a variety of monitoring systems to minimize insider abuses of electronic assets. However, most of these monitoring systems do not provide real-time notifications and real-time responses; as a result, the damage from an employee acting outside the scope of his/her authorization has long concluded when the employer learns of the employee's actions. The employee may have already left the employment of the employer (or left the country in cases of government employee abuses).

Another problem arises with existing monitoring systems as well. Applications accessed by users within a network environment may take a variety of not so obvious actions when persisting data to the file system, impeding a monitoring system's ability to clearly detect the final result of a persistent change in near real time. For example, when editing a file with Microsoft Word®, changes are made to a temporary copy of the original file. When the user saves their changes, the original file is deleted and the temporary file used during editing is renamed to the original file name. So, on completion of persisting changes to a file through Microsoft Word®, no file write operations occur on the original file. An observer that scans files would have to periodically compare file modification date for updates and then compare the file against an offline cache in order to determine if a change had actually occurred. Furthermore, the file handle (the file systems unique reference to a file) was changed during the save process making it difficult for automated systems to track the file of its lifetime.

Modern computing environments rely on file systems that are growing in size and complexity. Specifying every critical file that needs to be monitored individually is time intensive and hard to maintain as new critical files are introduced over time. In order to enable an effective monitoring strategy administrators need to be able to specify monitoring targets in groups (by location, by file type, by file name pattern, etc.) Further, because various applications interact with the file system in unique ways, this can cause monitoring systems to produce erroneous events and false positives.

Each user application can have its own idiosyncrasies that monitoring systems are not equipped to handle because they are largely based on a "one size fits all" approach and not customizable to address each specific user-application that an enterprise has in its network environment. Still further, applications are updated, upgraded, and added on a frequent basis, such that even if existing monitoring systems were capable of customization, they would need to be updated each time a new application is added or changed.

SUMMARY

Various embodiments of the invention provide techniques for near real-time detection of persistent resource changes. In an embodiment, a method for real-time detection of resource changes is presented.

Specifically, a kernel service is configured for identifying resources, and events associated with the resources and related resources are received from the kernel service. Finally, a determination is made as to whether to report event information relevant to one or more of the resources based on the events.

DETAILED DESCRIPTION

Figure 1:
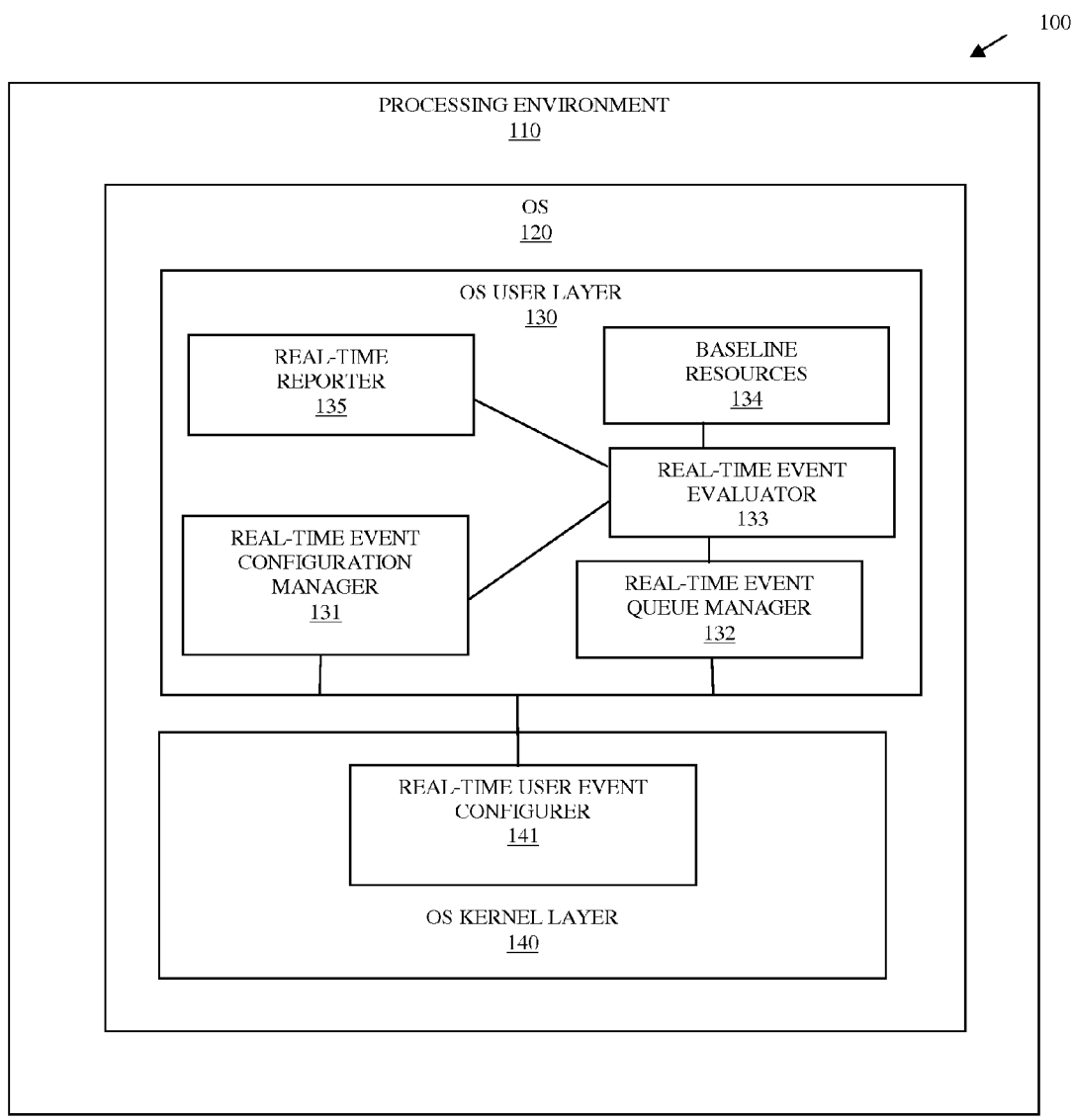
FIG. 1 is a diagram of a processing environment for practicing near real-time detection of persistent resource changes, according to an example embodiment presented herein.

A "resource" includes a user, service, system, device, directory, data store, file system, files, non-volatile data, non-volatile files, groups of users, combinations and/or collections of these things, etc. A "principal" is a specific type of resource, such as an automated service (process) or user that at one time or another is an actor on another principal or another type of resource. A designation as to what is a resource and what is a principal can change depending upon the context of any given transaction (communication). Thus, if one resource attempts to access another resource, the actor of the transaction may be viewed as a principal. Resources can acquire and be associated with unique identities to identify unique resources during network transactions.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X can be logically combined with another computing resource at network site Y to form a logical processing environment. The processing environment may also be tied in some embodiments to a specific physical network environment (such as a Local Area Network (LAN)) or a specific physical device.

The phrases "processing environment," "cloud processing environment," and the term "cloud" may be used interchangeably and synonymously herein.

Moreover, it is noted that a "cloud" refers to a logical and/or a physical processing environment as discussed above.

Further, as discussed herein, "real time" includes "near real time (only a very small delay (undetectable) from instantaneous)."

In an embodiment, "near real time" includes a time period from about 30 seconds to 90 seconds.

Various embodiments of this invention can be implemented in existing network architectures and processing environments.

Also, the techniques presented herein are implemented in (and reside within) machines, such as processor(s) or processor-enabled devices (hardware processors). These machines are configured and programmed to specifically perform the processing of the methods and system presented herein. More particularly, the methods and system components are implemented as one or more software modules that reside or are programmed within: memory and/or a non-transitory computer-readable storage media; the software module(s) are processed on the processors of machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension of particular embodiments only and is not intended to limit other embodiments of the invention presented herein and below.

It is within this context that embodiments of the invention are now discussed within the context of the FIGS. 1-4.

FIG. 1 is a diagram 100 of a processing environment for practicing real-time detection of non-volatile resource changes, according to an example embodiment presented herein. The processing environment 110 and components 120-141 are shown for purposes of illustrating particular embodiments of the invention; it is to be noted that other arrangements of more or less components are possible without departing from the illustrated embodiments.

Moreover, it is to be noted that the various components 110-141 are presented in greatly simplified form with just components shown for purposes of understanding the presented embodiments.

The processing environment 110 includes an operating system (OS) 120 having an OS user layer 130 execution space and an OS kernel layer execution space 140. The OS kernel layer 140 includes a real-time user event configurer 141. The OS user layer 130 includes: a real-time event configuration manager 131, a real-time event queue manager 132, a real-time event evaluator 133, a set of one or more baseline resources 134, and a real-time reporter 135. Each of these will now be discussed in turn along with example illustrations for operation of the processing environment 110.

The processing environment 110 includes a variety of resources, such as but not limited to, cache, non-transitory storage, non-volatile data/files, memory, processors, port interfaces, network connections, the components 120-141, and the like.

It is also noted that in an embodiment, the processing environment 110 can be a single device (such as a laptop, a phone, a wearable processing device, a desktop computer, a tablet, and the like).

In an embodiment, the processing environment 110 is a virtual machine (VM) or a collection of VMs.

In an embodiment, the processing environment 110 is a cloud environment.

In an embodiment, the processing environment 110 is a server environment.

The OS 120 provides a platform within the processing environment 110 for accessing physical resources and for executing software resources (such as components 130-141). The processing environment 110 also includes non-volatile data/file resources acted upon by the software resources (such as components 130-141 and other software resources initiated by principals (users or automated processes)).

In an embodiment, the OS 120 is an open source OS, such as but not limited to one of: Tizen, Unix®, Linux, Suse Linux®, Android, and the like.

In an embodiment, the OS 120 is a proprietary OS, such as but not limited to one of: Blackberry®, Windows®, iOS®, and the like.

The OS 120 includes two modes of operation: a kernel mode existing in the execution space associated with the OS kernel layer 140 and the user or application mode existing in the execution space associated with the OS user layer 130.

The kernel mode takes care of a variety of low level processes for the OS 120 and applications that execute in the user or application mode. In fact, a user application, which originates at the user mode of the OS 120, may use an API to have the OS 120 execute a number of kernel functions (in the kernel layer 140) to carry out the user application requests. For operations related to data hierarchy, the operations are called Input/Output Request Packets (IRPs).

The real-time event configuration manager 131 registers as a handler for a class of IRPs.

The OS kernel layer 140 includes the real-time user event configurer 141. The real-time user event configurer 141 monitors resource actions (that it is configured to recognize) and collects a variety of information related to those actions, such as resource identifiers (this includes the acting resource that initiated activity on another resource (such as a particular user or user thread X reads resource Y (both X and Y are captured in a single event))), action identifiers, time stamps, and the like. When the real-time user event configurer 141 detects an action on a resource, the real-time user event configurer 141 generates event information including the collected information in an event that is raised up from the OS kernel layer 140 and detected by the real-time event queue manager 132.

The real-time event configuration manager 131 operates in the OS user layer 130 and is used to configure the real-time user event configurer 141 by passing configuration information to the real-time user event configurer 141. The configuration information informs or defines criteria for events that the event notification manager 141 is to trap and report in real time from the OS kernel layer 140 back up to the OS user layer 130.

The configuration information can include: 1) specific resource identifiers (file names, process/application names, directory names, etc.), 2) resource identifiers defined by regular expressions and dynamically evaluated for resources and/or extensions of resources (e.g., "*," "*.doc," etc.), 3) specific composite resources or composite resources defined by regular expressions (such as folders, directories, repositories, etc.), and 4) specific hierarchies of composite resources or hierarchies defined by regular expressions (collections of composite resources).

The configuration information can be supplied to the real-time event configuration manager 131 via an interface (not shown in the FIG. 1) from an administrator (type of user). In an embodiment, the interface is a Graphical User Interface (GUI). In an embodiment, the configuration information can be supplied via an automated process through Application Programming Interface (API) calls between the automated process and the real-time event configuration manager 131.

So, the real-time event configuration manager 131 dynamically supplies configuration information to the real-time user event configurer 141. The real-time user event configurer 141 uses the configuration to monitor resource activity at the OS kernel layer 140 for the configuration information and when a matching resource occurs, the corresponding event with the event information is raised up to the OS user layer 130 and detected by the real-time event queue manager 132 (configured to detect events raised by the real-time user event configurer 141.

The real-time event configuration manager 131 also provides configuration of the real-time event evaluator 133. That is, the real-time event configuration manager 131 configures real-time event evaluator 133 to monitor events for resources over a given short period of time (a relatively small period of time that begins when a resource defined by the configuration information (discussed above) is first detected as having been accessed in some manner by the real-time user event configurer 141). In an embodiment, the time period is between 30 and 90 seconds. Although, it is noted the period of time can be configured by the real-time event configuration manager 131 and the real-time event configuration manager 131 can receive the period of time via an API or GUI interface (from another automated application/service or a user, respectively).

It is noted that this is an improvement over conventional monitoring systems, which have an extended period of time well-beyond 90 seconds during which such systems poll resources for changes. The conventional approaches are ineffective in many situations because by the time they realize a change occurred to a protected resource, there is little evasive action that can be taken as the damage is already done. Plus detection of changes in a convention monitoring system polls or pulls changes and does not get real time or near real time pushes for changes.

The real-time event configuration manager 131 can also configure the real-time event evaluator 133 with policies (may also be received by the real-time event configuration manager 131 via an API or GUI). The policies are conditions that inform the real-time event evaluator 133 on when the real-time event evaluator 133 should raise an event based on activity occurring in the queues for events received for the monitored resources (defined by the configuration information) during the monitored period of time (short during, such as between 30-90 seconds, which gives activity for resources a chance to stabilize and reduces noise associated with OS activity that may be irrelevant to whether the resource was changed or not).

In an embodiment, the policies conditions include patterns of activity performed on a given resource that indicate reporting needs to occur.

It is also noted that the changes are for non-volatile changes (changes to data that are to be stored in non-volatile storage) because the OS 120 may perform a variety of memory management and other activities that result in some volatile memory changes, which is just noise and do not need to be tracked. Such that by monitoring just non-volatile changes to resources over a short evaluation period for patterns of activity (identified by the aggregated events for the evaluation period) noise can be filtered out and just relevant changes captured. This also reduces the evaluation period and improves both processing and memory efficiencies.

The queues are managed by the real-time event queue manager 132. The real-time event queue manager 132 receives the events from the real-time user event configurer 141 in real time and creates a series of queues (can also be a single queue for all resource activity during the evaluation period). Each queue representing a specific resource (using a resource identifier for that resource). Moreover, a single event may include event information relevant to two or more resources, such that the event information is populated by the real-time event queue manager 132 to multiple queues (one queue per resource identifier). When the evaluation period (monitored period of time) lapses, the real-time event evaluator 133 can instruct the real-time event queue manager 132 to flush (clear out contents) queues associated with given resources.

The evaluation period also allows OS kernel layer 140 activities for a given resource having detected events to stabilize before decisions are made by the real-time event evaluator 133. In an embodiment, each event that identifies a resource for a first time causes the evaluation period for that resource to be initiated. So, the evaluation period can, in one embodiment, be resource specific meaning that there can be multiple independent evaluation periods continually being reset and/or initialized as resources cease to have kernel activity and as resources start to have kernel activity. In an embodiment, the evaluation period is for all registered resource activities for all resources detected during the evaluation period, with the evaluation period being regularly reset each time it lapses to provide continuous monitoring of the processing environment 110.

Moreover, when a resource is first detected (by a monitored event) as having been accessed at the OS kernel layer 140, the real-time event evaluator 133 ensures that a copy of that resource is populated and securely maintained and persisted (unchanged) in the baseline resources 134 for the duration of the evaluation period.

The baseline resources 134 can be used to detect the extent of changes made to resources at the conclusion of the evaluation period. The copy of the resources in the baseline resources 134 are copies of the resources before any volatile operations occurred on those resources, such that at the conclusion of the evaluation period for a given resource, the final version of the given resource can be compared against its baseline version in the baseline resources 134 to provide more meaningful details on the extent of the actual changes beyond just a binary reporting that a change occurred.

In an embodiment, the baseline resources 134 are housed in cache.

In an embodiment, the baseline resources 134 are housed in storage.

In an embodiment, some of the baseline resources 134 are housed in cache and some of the baseline resources 134 are housed in storage.

At the conclusion of the evaluation period, the real-time event evaluator 133 uses policy conditions (configured by the real-time event configuration manager 131) to make decisions on whether any reporting is necessary or whether the activity on the resource can be ignored. This can be done by aggregating all events for each resource over the evaluation period and then evaluating the policy conditions.

So, at the conclusion of the evaluation period, all events and their corresponding event information can be aggregated or consolidated into a single consolidated event for each resource and the policy conditions dynamically, and in real time, evaluated by the real-time event evaluator manager 133.

These policy conditions can include whether a given resource was deleted, created, modified (written to), read, and/or had access/security permissions changed. The policy conditions can also identify patterns of activity or behavior taken on the resources during the evaluation period. Moreover, as stated above, the event information for the events can identify both the acting resource (user thread or application) and the resource that was acted upon. Such that the policy conditions can state fine-grain rules, such as if an acting resource belonging to a particular role or group reads a file (type of resource) belong to a particular user-defined classification of files, then report to an administrator (another type of resource) using via email (type of communication for the reporting). This is but one example, the point is coarse grain and fine grain user defined policy conditions can be defined and configured into the real-time event evaluator 133 by the real-time event configuration manager 131.

Some further examples of scenarios include the following:

1) is the file (type of resource) named in the consolidated event present in the file system of the processing environment; and 2) is the file named in the consolidated event present in the baseline resources 134?

The answers to these initial policy conditions can lead to other policy conditions, such as:

1) if the file is in the file system and in the baseline resources 134, then a change occurred during the evaluation period and the file needs to be compared to its version in the baseline resources 134 to see what was in fact changed or the extend of the changes;

2) if the file is in the file system but not in the baseline resources 134, then a new file was created during the evaluation period, which may or may not necessitate reporting (based on still other policy conditions);

3) if the file is not in the file system but is in the baseline resources 134, then an existing file as deleted during the evaluation period and assuming this is acceptable (based on the configured policy conditions), the file in the baseline resources 134 is also deleted; and 4) if the file is not in the file system and is not in the baseline resources 134, then no action is taken (assuming no other policy condition dictates any type of reporting).

In the example situation of some policy conditions (notice the policy conditions can be hierarchical and nested), when the file (type of resource) was in the file system (another type of composite resource) and in the baseline resources 134, then the real-time event evaluator 133 can instruct the real-time reporter 135 to report (or raise an event at the OS user layer 130), using the event information for the consolidated event being evaluated by the real-time event evaluator 133, stating user X (acting resource in the event information) modified or changed file Y (resource acted upon) at time Z by changing A to B, etc.

Again, the real-time event evaluator 133 sets an evaluation period and dynamically and in real time (or near real time) evaluates consolidated events for each of the resources at the conclusion of the evaluation period. The evaluation period is reset and continues while events are analyzed for a completed evaluation period. The resources are defined by the real-time event configuration manager 131 though configuration of the real-time user event configurer 141 and reporting occurs via the real-time reporter 135.

It is also noted that although modules 131-135 were shown as separate and independent modules, this does not have to be the case in every situation, since clearly some modules can be combined or all modules can be combined and still achieve the embodiments discussed herein.

One now appreciates how real time kernel level activity by resources on other resources of a processing environment 110 can be monitored independent of specific application resources executing in an OS user layer 130 to customize reporting or notifications for a monitored processing environment 110. This removes dependencies on the peculiarities of processing for application resources, removes noise activity, and evaluates just the non-memory (persistent) kernel activity of resources to provide more detailed and accurate reporting of activities for a monitored processing environment. Moreover, the reporting can be automated, such as when the real-time reporter 135 uses an API to interact with an automated service to take remedial real time action in response to the detected activity. So, the techniques not only improve security response times and the detail of security information but can also improve the quality of any security response and removes unnecessary OS noise. Still further, the techniques can be used for auditing and compliance. That is, the real-time event evaluator 133 can log the consolidated events for the resources for subsequent analysis (such as trend analysis, patterns, audit compliance reporting, and the like).

Some aspects of the embodiments presented with the discussion of the FIG. 1 (above) and other embodiments of the invention are now discussed with reference to the FIGS. 2-4.

Figure 2:
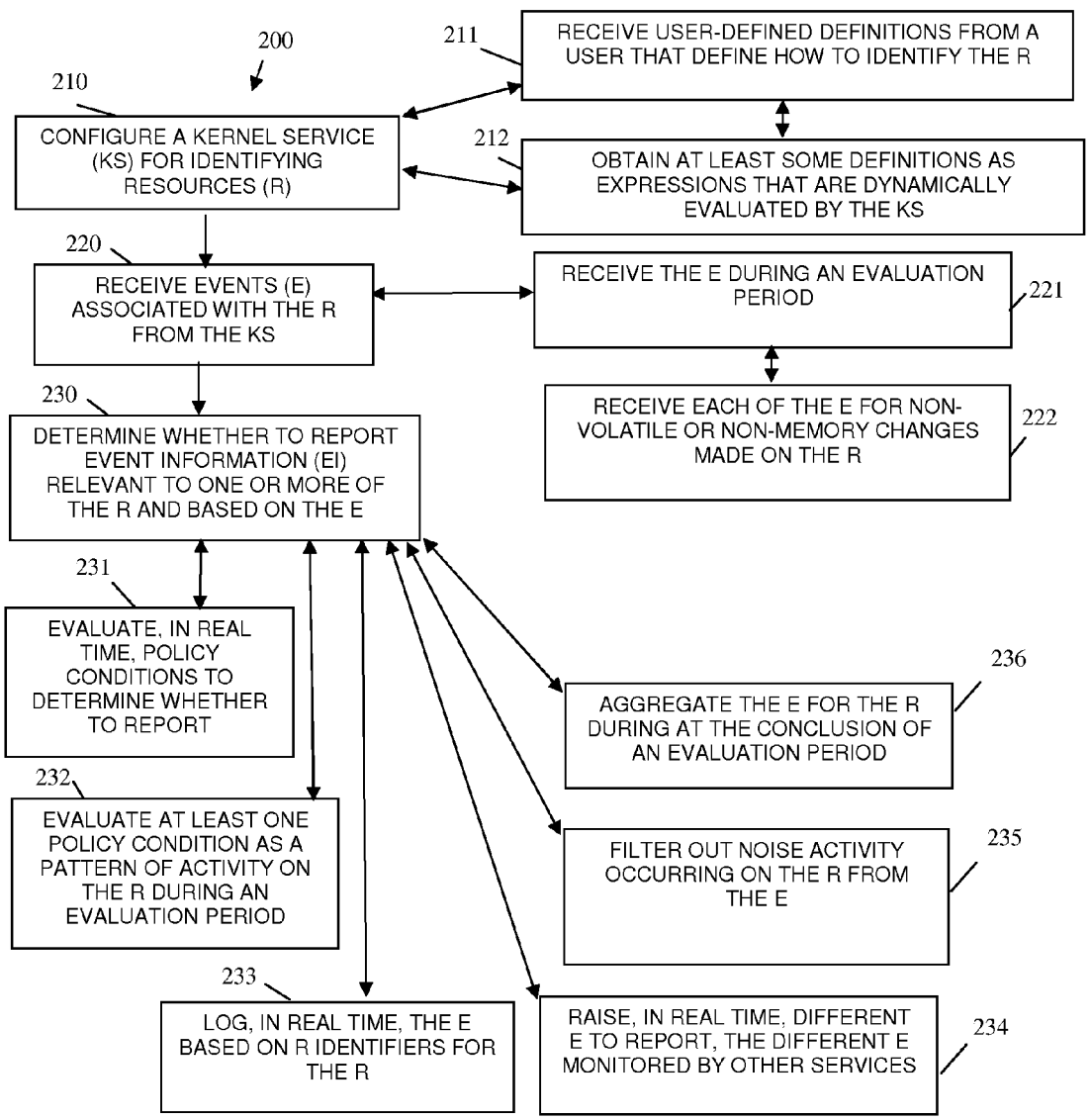
FIG. 2 is a diagram of a method for real-time detection of resource changes, according to an example embodiment.

FIG. 2 is a diagram of a method 200 for real-time detection of resource changes, according to an example embodiment. The method 200 is implemented as one or more software modules (herein after referred to as "real-time resource change manager"). The real-time resource change managers includes executable instructions that are implemented, programmed, and reside within memory and/or a non-transitory computer-readable storage media; the executable instructions execute on one or more processors of one or more devices and have access to one or more network connections associated with one or more networks. The networks may be wired, wireless, or a combination of wired and wireless.

In an embodiment, the real-time resource change manager executes on one or more devices of the processing environment 110 of the FIG. 1.

In an embodiment, the real-time resource change manager is a combination of the real-time event configuration manager 131, real-time event queue manager 132, real-time event evaluator 133, and the real-time reporter 135.

At 210, the real-time resource change manager configures a kernel service for identifying resources. This can be done via strings that represent regular expressions that the kernel service interprets to configure itself to identify resources to raise events for and collect event information for. It is noted that the strings can be constants as well or combinations of constants and regular expressions. In an embodiment, the strings are in a grammar format that the kernel service is configured to dynamically parse and evaluate.

In an embodiment, the kernel service is the real-time user event configurer 141.

According to an embodiment, at 211, the real-time resource change manager receives user-defined definitions from a user that define how to identify the resources. So, the user defines the strings using a GUI interfaced to the real-time resource change manager.

In an embodiment or 211 and at 212, the real-time resource change manager obtains at least some of the definitions as expressions that are dynamically evaluated by the kernel service (this was discussed above).

In an embodiment, the real-time resource change manager receives definitions from an automated application/service via API calls, which can be in a format having constants, regular expressions, or combinations of constants and regular expressions.

At 220, the real-time resource change manager receives events associated with the resources from the kernel service. The configuration of the kernel service directed the kernel service to identifying what resources to track and monitor and to raise events when detections were noted at the kernel level of the OS. This was discussed at length above with reference to the diagram 100.

In an embodiment, at 221, the real-time resource change manager receives the events during an evaluation period (such as a short configured period of time (can be provided as a processing parameter to the real-time resource change manager).

In an embodiment of 221 and at 222, the real-time resource change manager receives each of the events for non-volatile or non-memory changes made to the resource (changes that persist in storage for the resource at the conclusion of an evaluation period of time).

At 230, the real-time resource change manager determines whether to report event information relevant to one or more of the resources based on the event. Here, the event can be a consolidated event occurring over an evaluation period where the real-time resource change manager uses policy conditions to make the determination (as was discussed at length above with reference to the FIG. 1).

It is to be noted that the real-time resource change manager can evaluate multiple resources at the conclusion of the evaluation period for events associated with those other resources. A single resource is being discussed for purposes of illustration and comprehension only.

In an embodiment, at 231, the real-time resource change manager evaluates, in real time, policy conditions to determine whether to report. Again, this was discussed at length above and the policy conditions can be as complex as is desired by an enterprise and capable of being dynamically configured and used by the real-time resource change manager.

In an embodiment of 231 and at 232, the real-time resource change manager evaluates at least one policy condition as a pattern of activity on the resource during an evaluation period of time.

According to an embodiment, at 233, the real-time resource change manager logs, in real time, the event based on resource identifiers for the resource. The log can be utilized for a variety of purposes, such as but not limited to, trend analysis (at any level of granularity), audit compliance reporting, evaluation by automated applications/services, and the like.

In an embodiment, at 234, the real-time resource change manager raises, in real time, a different event to report that different event, which is monitored by other application/services. So, similar to the kernel service, the real-time resource change manager can generate events having event information that other services look for to act upon.

In an embodiment, at 235, the real-time resource change manager filters out noise activity occurring on the resource from the events.

In an embodiment, at 236, the real-time resource change manager, in real time, aggregates the events for the resource at the conclusion of an evaluation period for the evaluation. This was discussed at length above with reference to the diagram 100.

Figure 3:
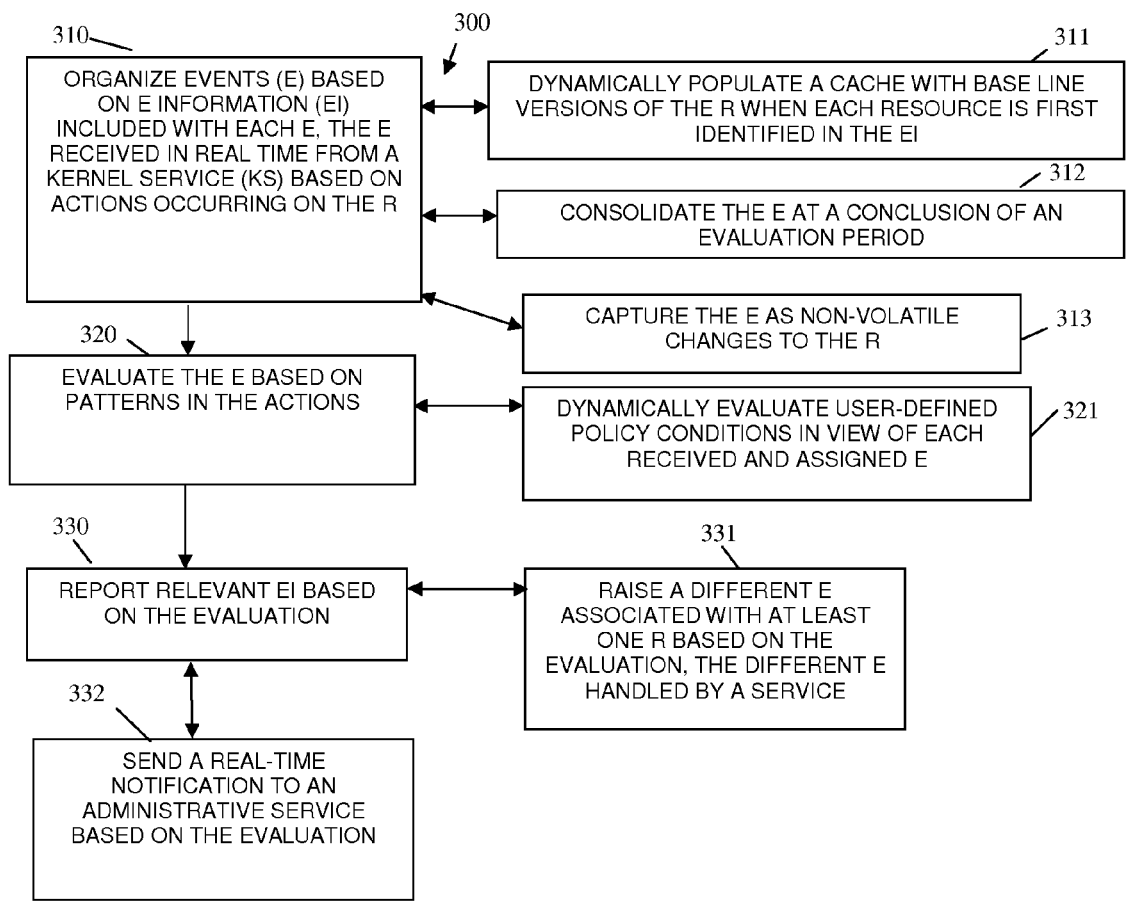
FIG. 3 is a diagram of another method for real-time detection of resource changes, according to an example embodiment.

FIG. 3 is a diagram of another method 300 for real-time detection of resource changes, according to an example embodiment. The method 300 is implemented as one or more software module(s) (herein after referred to as "real-time event evaluator"). The one or more software modules are represented as executable instructions that are implemented, programmed, and resides within memory and/or a non-transitory machine-readable storage medium; the executable instructions execute on one or more processors of one or more devices and have access to one or more network connections associated with one or more networks. The networks may be wired, wireless, or a combination of wired and wireless.

The real-time event evaluator represents some aspects of the real-time resource change manager, presented above with reference to the FIG. 2.

In an embodiment, the real-time event evaluator executes on one or more devices of the processing environment 110.

In an embodiment, the real-time event evaluator is the real-time event evaluator 133 and the real-time reporter 135.

At 310, the real-time event evaluator organizes events based on event information included in each event. The event received in real time from a kernel service based on actions occurring on the resources.

In an embodiment, at 311, the real-time event evaluator dynamically populates a cache with base line version of the resource when each resource is first identified in the event information of the event.

In an embodiment, at 312, the real-time event evaluator consolidates the events at a conclusion of an evaluation period.

In an embodiment, at 313, the real-time event evaluator captures the events as non-volatile changes to the resource (so changes that persist on the resource following the evaluation period and not just OS temporary memory management changes—filters out the noise).

At 320, the real-time event evaluator evaluates the events based on patterns in the actions by using the events at the conclusion of the evaluation period. These patterns can be configured in policy conditions that can be dynamically changed and provided to the real-time event evaluator for dynamic evaluation.

According to an embodiment, at 321, the real-time event evaluator dynamically evaluates user-defined policy conditions in view of each received and assigned event. Again, this can be a consolidated event over a given evaluation period.

At 330, the real-time event evaluator reports relevant event information based on the evaluation.

In an embodiment, at 331, the real-time event evaluator raises a different event associated with at least one resource based on the evaluation. The different event handled by another service and monitored by that service.

According to an embodiment, at 332, the real-time event evaluator sends a real-time notification to an administrative service based on the evaluation. The communication channel or mechanism used can be configured as well, such as API, log (indirect approach), posting to a web site, text message service, etc.

Figure 4:
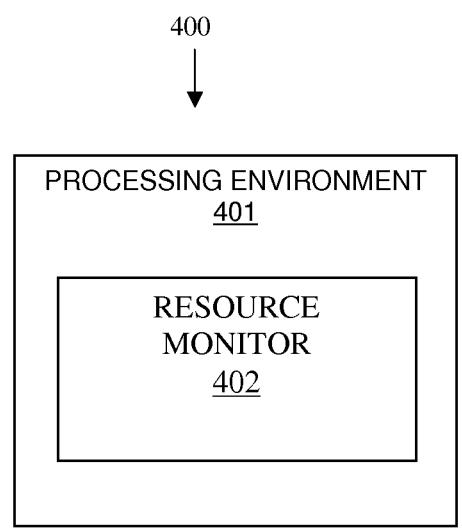
FIG. 4 is a diagram of a real-time resource change detection system, according to an embodiment.

FIG. 4 is a diagram of a real-time resource change detection system 400, according to an embodiment. Various components of the real-time resource change detection system 400 are software module(s) represented as executable instructions, which are programmed and/or reside within memory and/or non-transitory computer-readable storage media for execution by one or more devices. One or more of the components and/or the devices have access to one or more network connections over one or more networks, which are wired, wireless, or a combination of wired and wireless.

According to an embodiment, the real-time resource change detection system 400 implements, in whole or in part and inter alia, various features of the FIG. 1-3.

The real-time resource change detection system 400 includes a processing environment 401 and a resource monitor 402.

The processing environment 401 includes a variety of accessible processors, memory, storage, peripheral devices, an OS, software resources, and data resource (files, directories, file system, etc.).

In an embodiment, the processing environment 401 is the processing environment 110.

In an embodiment, the processing environment 401 is located on a single device or machine.

In an embodiment, the processing environment 401 is one or more VMs.

In an embodiment, the processing environment 401 is a distributed network-based processing environment that spans multiple hardware devices.

In an embodiment, the processing environment 401 is a cloud environment.

The resource monitor 402 is one or more software modules that execute on processors of the processing environment 401.

In an embodiment, the resource monitor 402 is the real-time event configuration manager 131, the real-time event queue manager 132, the real-time event evaluator 133, and the real-time reporter 135.

In an embodiment, the resource monitor 402 is the method 200 of the FIG. 2.

In an embodiment, the resource monitor 402 is the method 300 of the FIG. 3.

The resource monitor 402 is adapted or configured to: categorize real-time events generated by resources and received from a kernel service of an OS for the processing environment 401; evaluate each event (consolidated event for an evaluation period) at the conclusion of the evaluation period; and determine, in real time, whether to raise an administrative event based on each evaluation of each event.

According to an embodiment, the resource monitor 402 is further adapted to or configured to filter noise events out from the events before evaluation occurs.

It is also noted that the evaluation period continually resets and more events for resources are received and held for the conclusion of that evaluation period. The evaluation period itself is a configurable item that can be supplied dynamically as a processing parameter to the software modules discussed herein and above.

One now fully appreciates how resources of a processing environment can be monitored in real time and near real time to detect activity associated with users or processes that an enterprise desired notification of. This activity can be monitored at a much finer-grain level of detail that what conventional approaches achieve and filters out non-relevant noise associated with the activities.

Moreover, the techniques provide a variety of beneficial features including, but not limited to: identifying in real time what users and processes are doing within the processing environment, detecting in real time unauthorized access and changes to resources of the processing environment, detecting in real time security breaches, detecting in real time compliance issues, providing in real time fine-grain details on resource access, providing in real time notifications of changes to resources, providing in real time remediate to changes to the resources, and others.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
   configuring, by a resource change manager executing on one or more processors, a kernel service for identifying resources, wherein configuring further includes configuring the kernel service for an Operating System (OS) associated with the one or more processors;
   receiving, by the resource change manager, events for just non-memory persistent kernel activity associated with the resources from the kernel service, and wherein receiving further includes identifying each event as being associated with at least two resources that include an acting resource that initiates activity on a second resource and the second resource being acted upon by the acting resource; and
   determining, by the resource change manager, whether to report event information relevant to one or more of the resources and based on the events; and wherein determining further includes evaluating, in real time, policy conditions to determine whether to report, and at least one policy condition identifying whether a particular event is relevant to security permissions being changed for a particular resource for improving security response times, and removing from the report event information, before any reporting, OS event information identified as OS noise for improving quality of the report event information.

2. The method of claim 1, wherein configuring further includes receiving user-defined definitions from a user that define how to identify the resources.

3. The method of claim 2, wherein receiving further includes obtaining at least some definitions as expressions that are dynamically evaluated by the kernel service.

4. The method of claim 1, wherein receiving further includes receiving the events during an evaluation period.

5. The method of claim 4, wherein receiving further includes receiving each of the events for non-volatile or non-memory changes made on the resource.

6. The method of claim 1, wherein determining further includes evaluating at least one policy condition as a pattern of activity on the particular resource during an evaluation period.

7. The method of claim 1, wherein determining further includes logging, in real time, the events based on resource identifiers for the resources.

8. The method of claim 1, wherein determining further includes raising, in real time, different events to report, the different events monitored by other services.

9. The method of claim 1, wherein determining further includes filtering out noise activity occurring on the particular resource from the events.

10. The method of claim 1, wherein determining further includes aggregating the events for the particular resource at the conclusion of an evaluation period.

11. A method, comprising:
- organizing, by an event manager executing on one or more processors, events based on event information included with each event, the events received in real time from a kernel service based on actions occurring on resources, wherein organizing further includes executing the event manager within a kernel of an Operating System (OS) associated with the one or more processors, and wherein organizing further includes identifying each event as being associated with at least two resources that include an acting resource that initiates activity on a second resource and the second resource being acted upon by the acting resource;
- evaluating, by the event manager, the events for just non-memory persistent kernel events that are based on patterns in the actions, and wherein evaluating further includes evaluating, in real time, policy conditions and at least one policy condition identifying whether a particular event is relevant to security permissions being changed for a particular resource for improving security response times; and
- reporting, by the event manager, relevant event information based on the evaluation, and removing from the event information, before any reporting, OS event information identified as OS noise for improving quality of the event information.

12. The method of claim 11, wherein organizing further includes dynamically populating a cache with base line versions of the resources when each resource is first identified in the event information.

13. The method of claim 11, wherein organizing further includes consolidating the events at a conclusion of an evaluation period.

14. The method of claim 11, wherein organizing further includes capturing the events as non-volatile changes to the particular resource.

15. The method of claim 11, wherein evaluating further includes dynamically evaluating user-defined policy conditions in view of each received event.

16. The method of claim 11, wherein reporting further includes raising a different event associated with at least one resource based on the evaluation, the different event handled by a service.

17. The method of claim 11, wherein reporting further includes sending a real-time notification to an administrative service based on the evaluation.

18. A system, comprising:
- one or more hardware processors configured to execute and provide a processing environment; and
- a real-time resource monitor adapted and configured to: i) execute on the one or more hardware processors of the processing environment, ii) categorize real time events generated by resources and received from a kernel service of an operating system (OS) for the processing environment, and identify each event as being associated with at least two resources that include an acting resource that initiates activity on a second resource and the second resource being acted upon by the acting resource, iii) evaluate each event just non-memory persistent kernel activity associated with the at least two resources, in real time, at a conclusion of an evaluation period, by evaluating policy conditions and at least one policy condition identifying whether a particular event is relevant to security permissions being changed for a particular resource for improving security response times and iv) determine, in real time, whether to raise an administrative event based on the evaluation and remove from the administrative event OS event information associated with the administrative event before any raising of the administrative event, the OS event information identified as OS noise for improving quality of the administrative event.

19. The system of claim 18, wherein the real-time resource monitor is further operable to v) filter noise events out for the evaluation.

* * * * *

UNITED STATES PATENT AND TRADEMARK OFFICE
CERTIFICATE OF CORRECTION

PATENT NO. : 9,779,237 B2  
APPLICATION NO. : 14/211988  
DATED : October 3, 2017  
INVENTOR(S) : Littlejohn et al.

Page 1 of 1

It is certified that error appears in the above-identified patent and that said Letters Patent is hereby corrected as shown below:

In the Claims

In Column 12, Line 37, in Claim 1, delete "events;" and insert --events,-- therefor In Column 14, Line 24, in Claim 18, after "event", insert --for--

Signed and Sealed this  
Twenty-eighth Day of April, 2020

Andrei Iancu  
*Director of the United States Patent and Trademark Office*